(12) United States Patent
Kurata et al.

(10) Patent No.: US 6,679,520 B2
(45) Date of Patent: Jan. 20, 2004

(54) VEHICULAR AIR BELT SYSTEM

(75) Inventors: Norihiro Kurata, Saitama (JP); Takeshi Kuroe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/085,762

(22) Filed: Mar. 1, 2002

(65) Prior Publication Data

US 2002/0130498 A1 Sep. 19, 2002

(30) Foreign Application Priority Data

Mar. 2, 2001 (JP) ........................................ 2001-058924

(51) Int. Cl.[7] .................. B60R 21/13; B60R 21/18; B60R 22/20
(52) U.S. Cl. ................... 280/733; 280/801.2; 280/751; 280/756
(58) Field of Search .............................. 280/733, 728.2, 280/801.2, 808, 751, 748, 756

(56) References Cited

U.S. PATENT DOCUMENTS

| | | | | |
|---|---|---|---|---|
| 3,964,798 A | * | 6/1976 | Burleigh | 280/801.2 |
| 4,311,323 A | * | 1/1982 | Provensal | 280/801.2 |
| 5,303,953 A | * | 4/1994 | Kamiyama et al. | 280/733 |
| 5,851,055 A | * | 12/1998 | Lewis | 280/733 |
| 6,010,151 A | * | 1/2000 | Honda | 280/733 |
| 6,244,621 B1 | * | 6/2001 | Kameyoshi et al. | 280/733 |
| 6,302,477 B1 | * | 10/2001 | Satou | 280/751 |

FOREIGN PATENT DOCUMENTS

| | | | | |
|---|---|---|---|---|
| JP | 11165605 A | | 6/1999 | |
| JP | 11268610 A | * | 10/1999 | B60R/22/14 |

* cited by examiner

*Primary Examiner*—Peter C. English
(74) *Attorney, Agent, or Firm*—Birch, Stewart, Kolasch & Birch, LLP

(57) ABSTRACT

To enable the easy adjustment of the height of the upper end of a shoulder belt of webbing utilizing a shoulder guard provided to a strut provided on both right and left sides of a seat. An air belt system is provided with webbing in which a lap belt that cannot be inflated and a shoulder belt that can be inflated are connected to each other. A retractor is provided to one side of a seat for winding the end of the lap belt. A tongue is supported in an intermediate part of the webbing so that the tongue can slide relative thereto. A buckle is provided on the other side of the seat for connecting the tongue so that the tongue can be detached. An inflator is connected to the end of the shoulder belt for supplying high pressure gas to the shoulder belt. Right and left shoulder guards are respectively provided to the struts provided on both right and left sides of the seat so that the upper and lower positions can be adjusted. The upper end of the shoulder belt and the inflator are attached to right or left shoulder guards.

15 Claims, 9 Drawing Sheets

VEHICULAR AIR BELT SYSTEM

CROSS-REFERENCE TO RELATED APPLICATIONS

The present application claims priority under 35 USC 119 to Japanese Patent Application No. 2001-058924 filed on Mar. 2, 2001.

BACKGROUND OF THE INVENTION

1. Field of the Invention

The present invention relates to an air belt system that inflates a part of the webbing with high pressure gas supplied from an inflator for restraining an occupant on a seat when a vehicle collides.

2. Description of Background Art

An air belt system for an automobile that houses a bag inside the webbing of a seat belt and softly restrains an occupant by inflating the bag when a vehicle collides is disclosed in Japanese published unexamined patent application No. Hei 11-165605. As shown in FIG. 9, for this air belt system, the end of a shoulder belt 04 of webbing 03 is connected to an inflator 02 provided inside an automobile center pillar 01 and when the automobile collides, high pressure gas caused by the inflator 02 is directly supplied to the shoulder belt 04 to inflate the shoulder belt.

In the air belt system as in a seat belt system, if the height of the upper end of the shoulder belt can be also adjusted in accordance with the seated height of an occupant, a sense of installation of the air belt system is enhanced and the restraint performance in inflation can be enhanced. However, for the above-mentioned conventional type, the upper end of the shoulder belt and the inflator are fixed to the center pillar so that they cannot be moved. The conventional type of shoulder belt has a structure wherein the height cannot be adjusted.

SUMMARY AND OBJECTS OF THE INVENTION

The present invention enables an easy adjustment of the height of the upper end of a shoulder belt of webbing by utilizing a shoulder guard provided on struts provided on both the right and left sides of a seat.

To achieve the object, according to the present invention, a vehicular passive safety device provided which is based upon a vehicular passive safety device provided with webbing in which a lap belt that cannot be inflated and a shoulder belt that can be inflated are connected. A retractor is provided to one side of a seat for winding the end on the side of the lap belt of the webbing. A tongue is supported in an intermediate part of the webbing so that the tongue can slide relative thereto. A buckle is provided on the other side of the seat for connecting the tongue so that the tongue can be detached and an inflator connected to the end on the side of the shoulder belt of the webbing for restraining an occupant seated on the seat by inflating the shoulder belt of the webbing with high pressure gas caused by the inflator when the vehicle collides. The end on the side of the shoulder belt of the webbing and the inflator are attached to one of right and left shoulder guards wherein the struts provided on both right and left sides of the seat at the upper and lower positions can be adjusted for protecting the shoulders of an occupant.

According to the above-mentioned configuration, as the end on the side of the shoulder belt of the webbing of the air belt system and the inflator are attached to one of the right and left shoulder guards provided to the struts on both right and left sides of the seat wherein the upper and lower positions can be adjusted, the height of the shoulder belt attached to the shoulder guard can be manually adjusted to a suitable height in accordance with the seated height of an occupant. The height of the shoulder guard is adjusted in accordance with the seated height of the occupant. In addition, a reduction in time and labor for the adjustment occurs. As the inflator is also attached to the shoulder guard and is also vertically moved together with the shoulder belt, the positional relationship between the inflator and the shoulder belt is unchanged and a supply path of a high pressure gas from the inflator to the shoulder belt can be simplified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The invention will be described based upon embodiments of the invention shown in attached drawings below.

Figure 1:
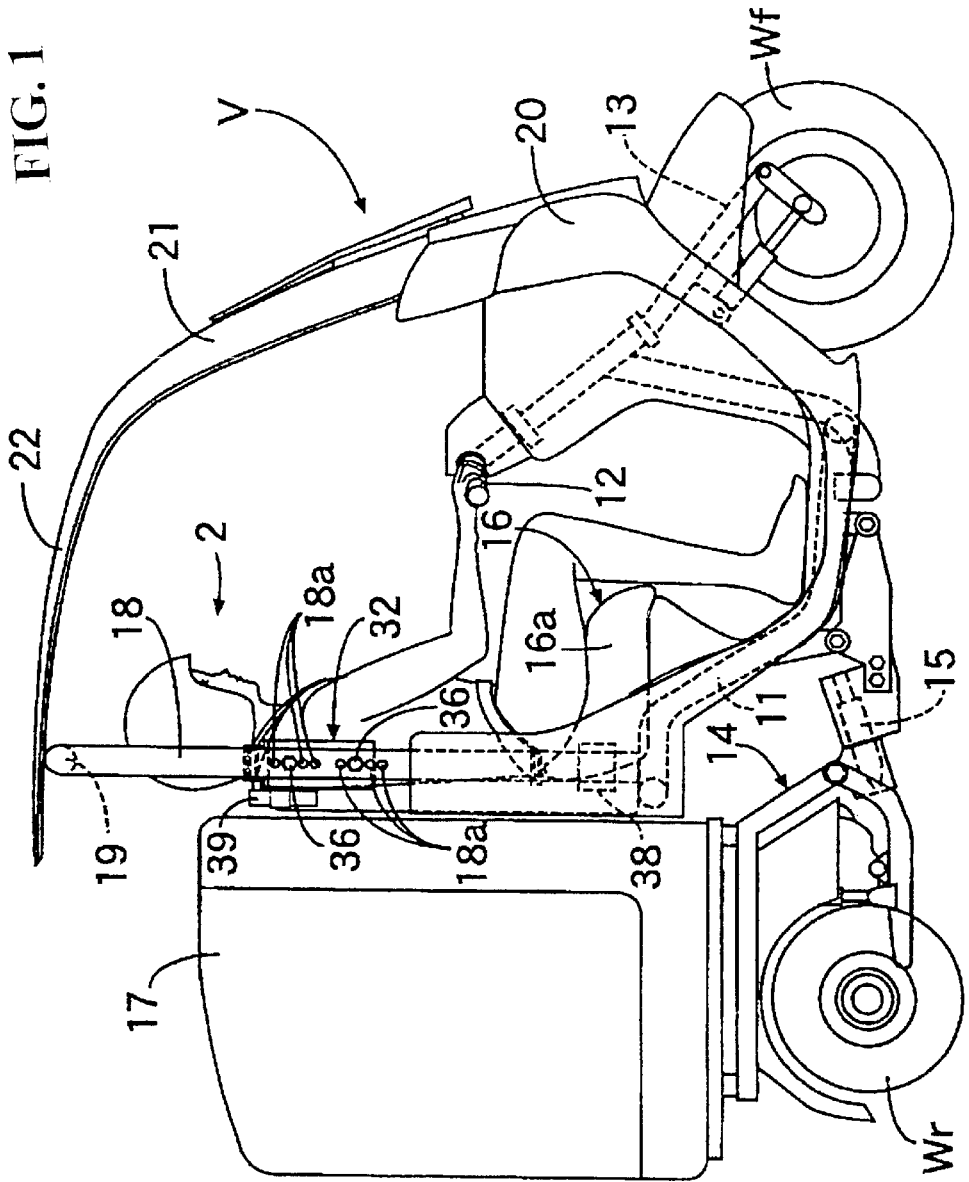
FIG. 1 is a general side view showing a three-wheeled vehicle.
Figure 2:
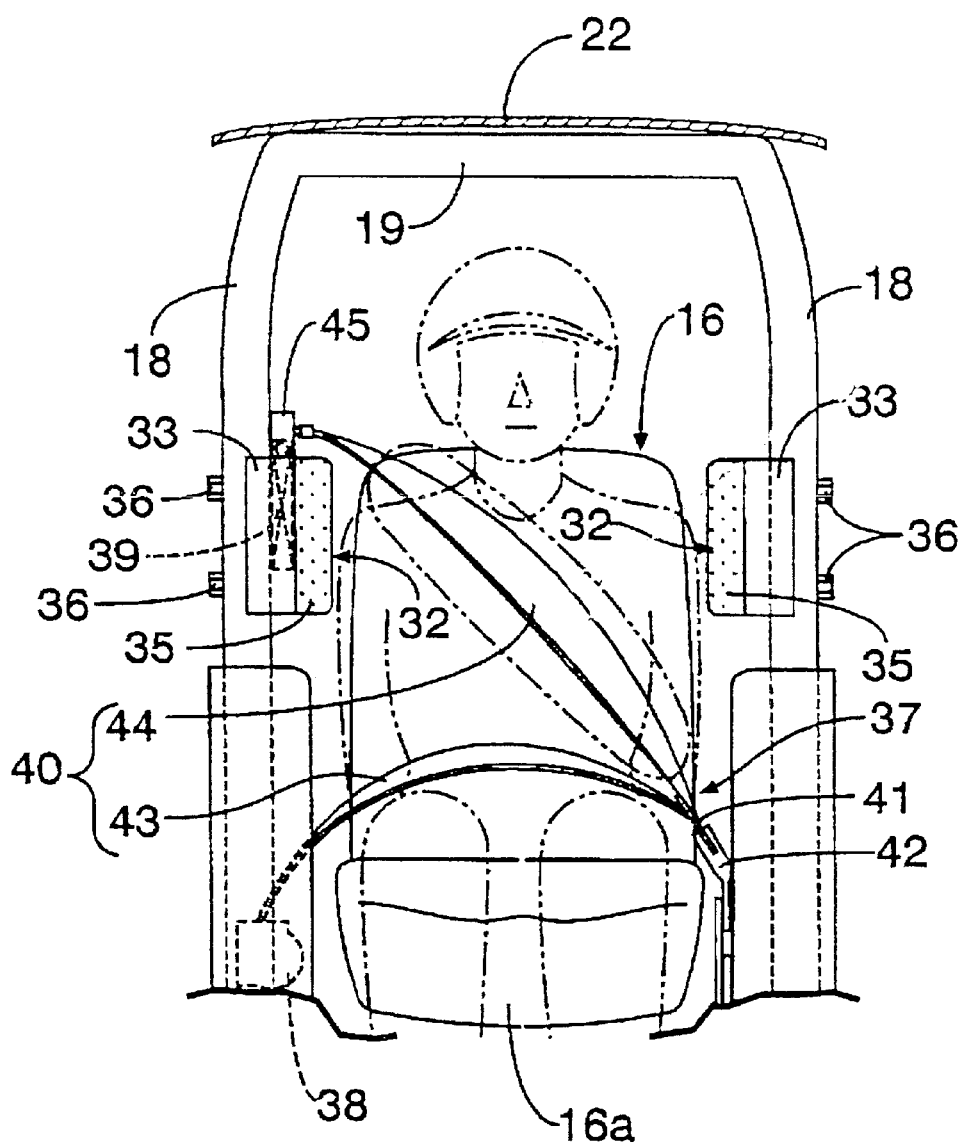
FIG. 2 is a view from a direction shown by an arrow 2 in FIG. 1.
Figure 3:
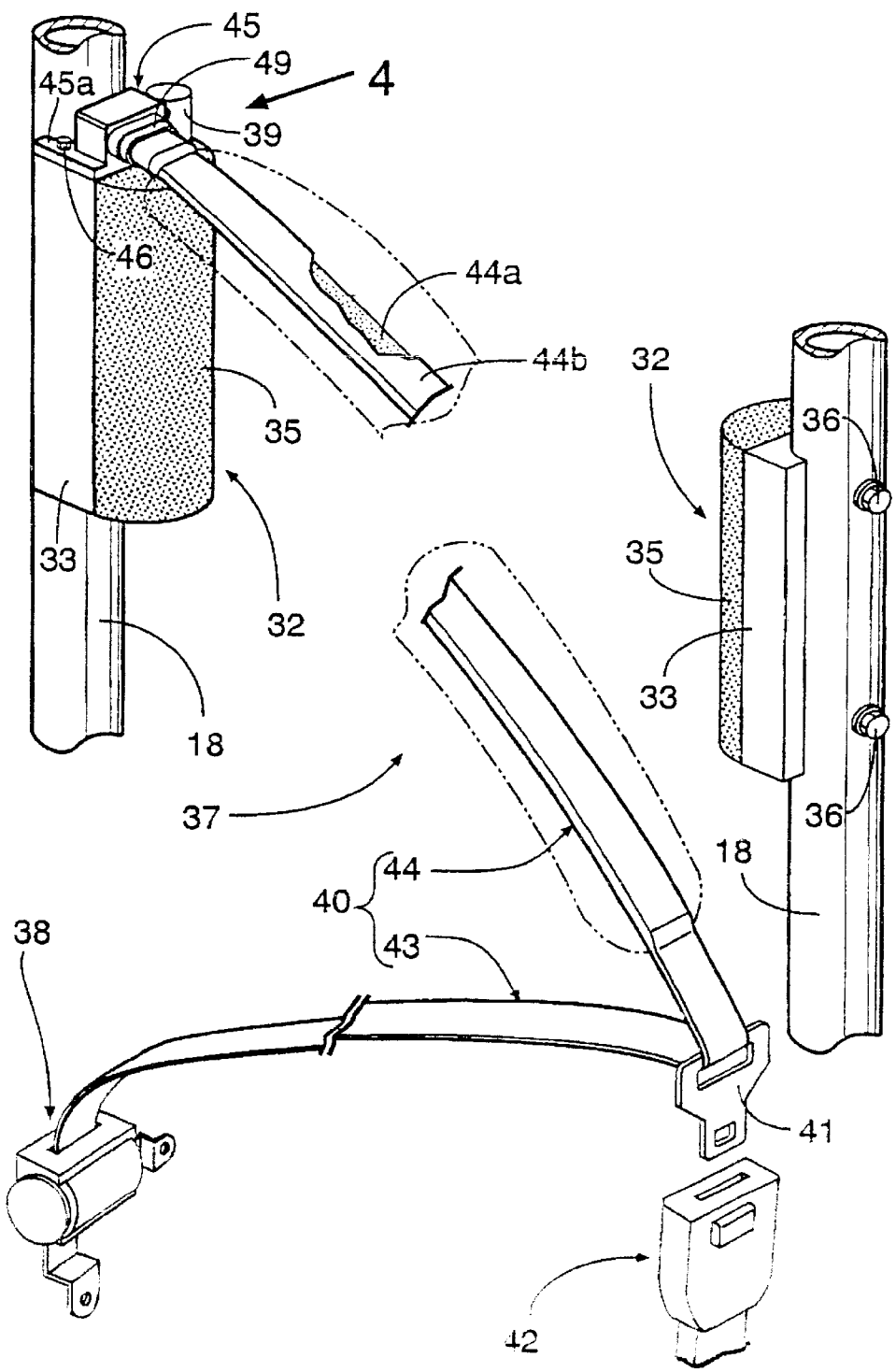
FIG. 3 is a perspective view showing an air belt system.
Figure 4:
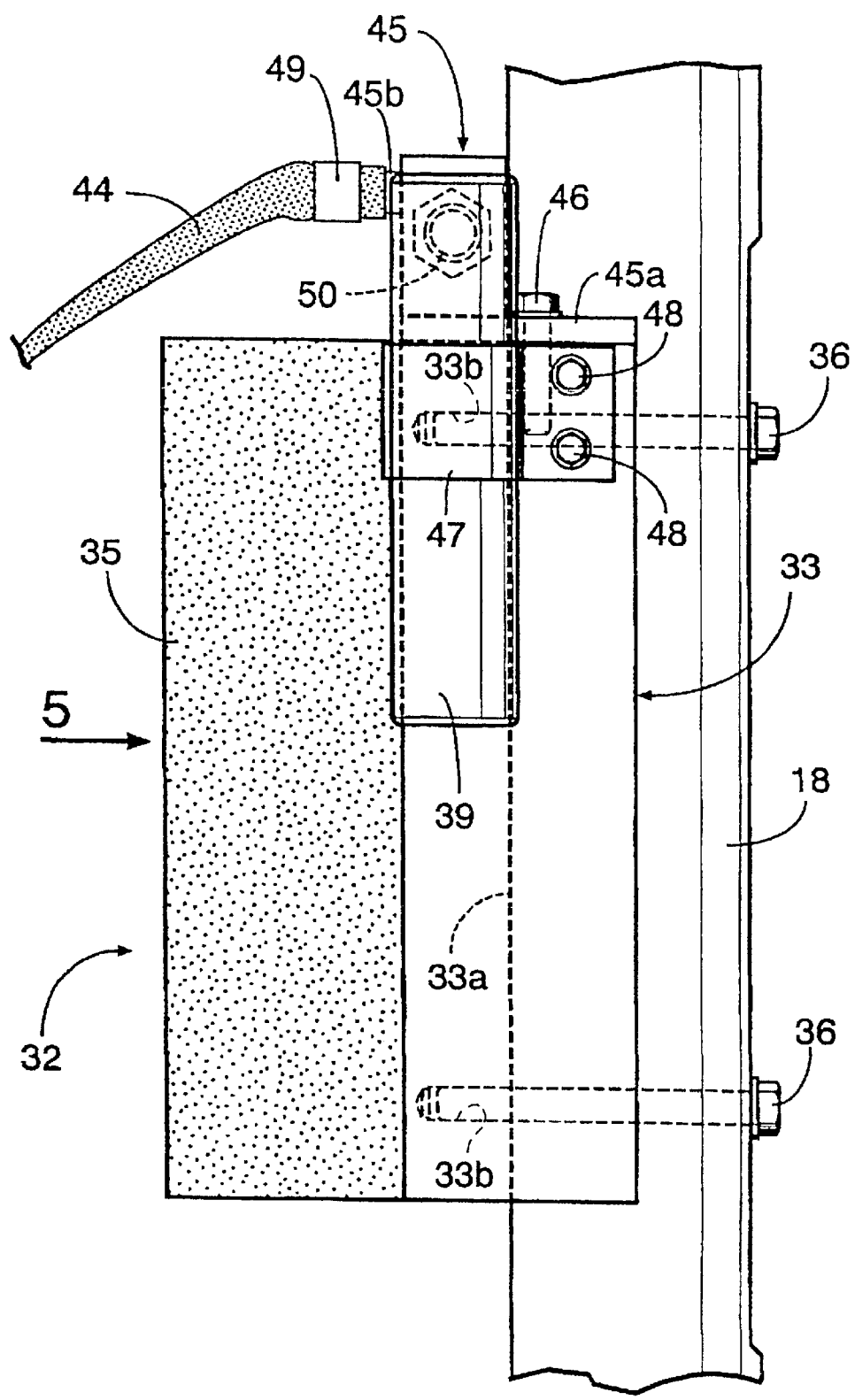
FIG. 4 is a view from a direction shown by an arrow 4 in FIG. 3.
Figure 5:
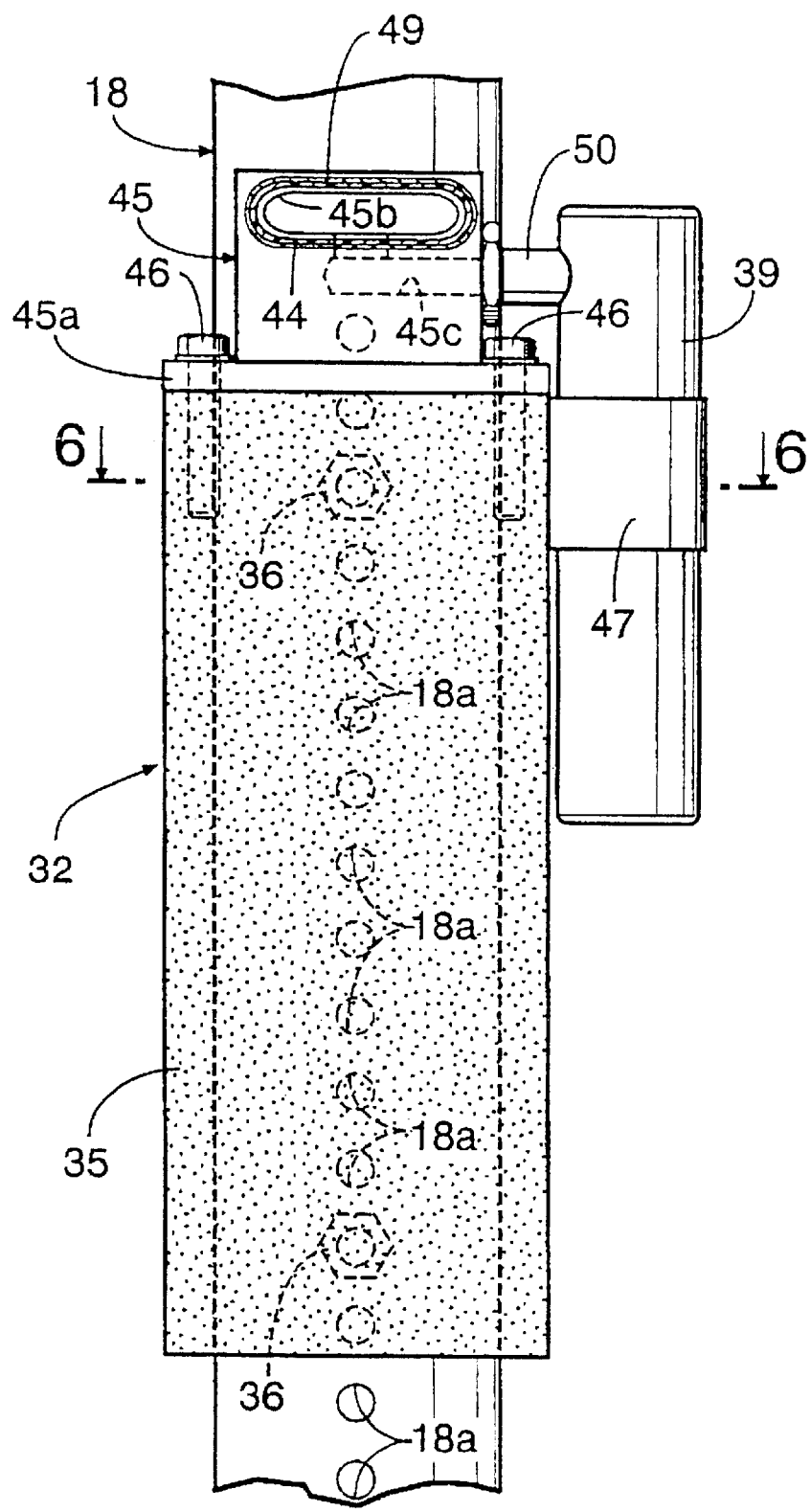
FIG. 5 is a view from a direction shown by an arrow 5 in FIG. 4.
Figure 6:
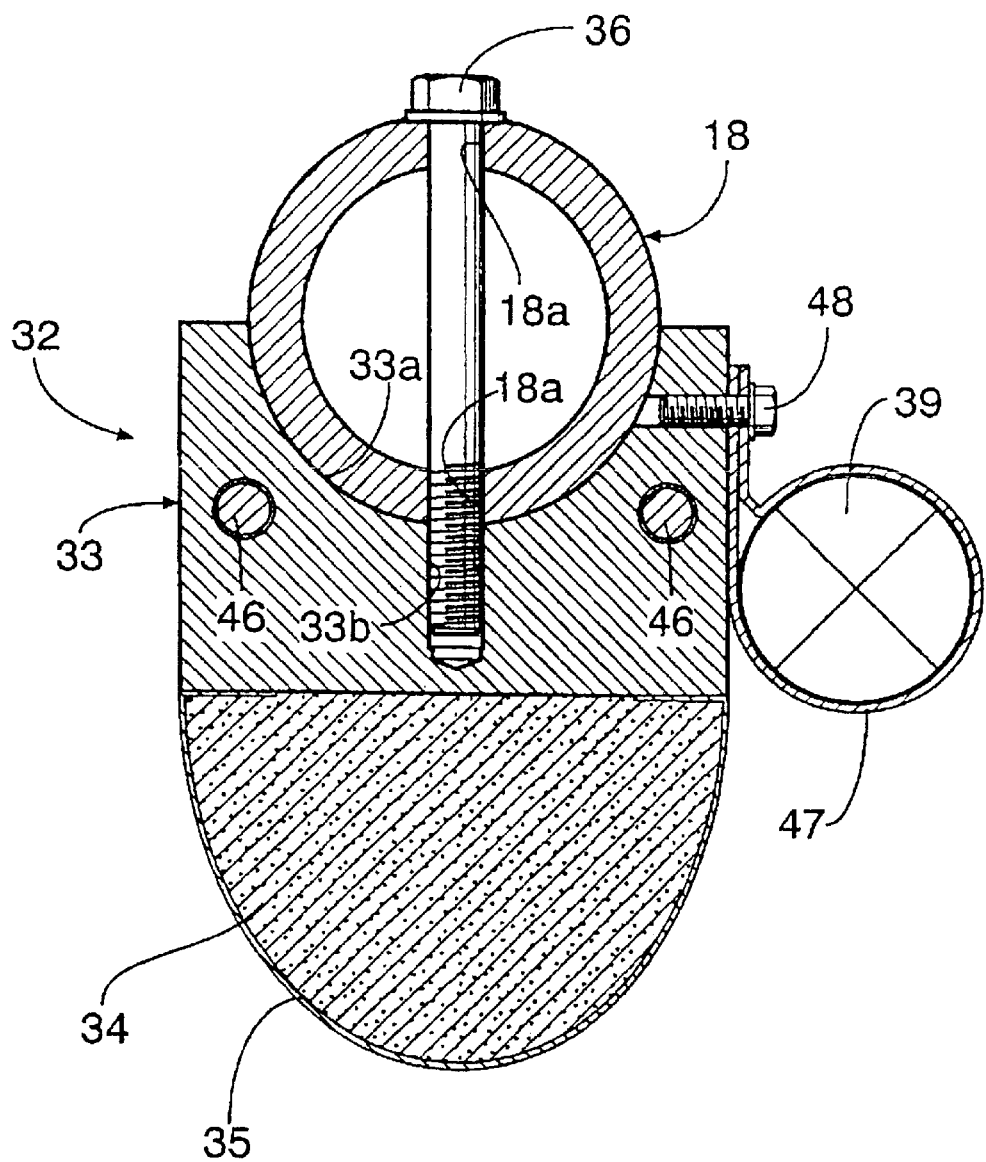
FIG. 6 is a sectional view along a line 6—6 in FIG. 5.

As shown in FIGS. 1 and 2, the three-wheeled vehicle V is provided with one front wheel Wf arranged in the front of the vehicle body and a pair of right and left rear wheels Wr and Wr arranged in the rear of the vehicle body. The front wheel Wf is provided at the lower end of a fork 13 connected to a bar handle 12 supported by a body frame 11 and can be steered right and left by the operation of the bar handle 12. A swing unit 14 in which an engine and a transmission are integrated is supported in the rear of the body frame 11 via a pivot 15 so that the swing unit can be swung right and left and the rear wheels Wr and Wr which are driving wheels are provided to the swing unit 14. A seat 16 on which an occupant is seated is provided over the body frame 11 and a glove compartment 17 supported on the swing unit 14 is arranged at the back of the seat 16. Two struts 18 and 18 are provided on both sides of the seat 16. A roof supporter 19, connecting the respective upper ends of both struts 18 and 18, and the upper end of a leg shield 20 are connected by a wind shield 21 and a roof 22.

As clear referring to FIGS. 3 to 6, a pair of right and left shoulder guards 32 and 32 are connected to the struts 18 and 18 positioned on the right and on the left of the occupant seated on the seat 16 to prevent the shoulders of the occupant from directly touching the struts 18 and 18. Each shoulder guard 32 is provided with a base plate 33 in which a circular arc-shaped groove 33a is fitted to the circular section of the strut 18. A cushion material 34, such as a sponge, is fixed on the base plate 33. A facing 35 covers the surface of the cushion material 34. The shoulder guard 32 is fixed to the strut 18 by screwing two bolts 36 and 36 that pierce any two of multiple bolt holes 18a piercing the strut 18 into upper and lower two bolt holes 33b and 33b formed in the base plate 33 so that the upper and lower positions of the shoulder guard 32 can be arbitrarily adjusted in accordance with the seated height of the occupant.

The air belt system 37 that restrains the occupant on the seat 16 is provided with a retractor 38 provided on the right side of a seat cushion 16a. An inflator 39 is provided to the right shoulder guard 32. Webbing 40 includes ends which are supported by the retractor 38 and the inflator 39. A tongue 41 is supported in an intermediate portion of the webbing 40 so that the tongue can slide relative thereto. A buckle 42 is provided to the left side of the seat cushion 16a and to which the tongue 41 is coupled so that the tongue 41 can be detached.

The retractor 38 winds the webbing 40 so that one end can be pulled out. During normal operation, when a mechanical acceleration sensor does not detect the acceleration of a predetermined value or more, the webbing 40 can be pulled out and movement of the occupant's body is permitted. When the mechanical acceleration sensor detects acceleration at or above the predetermined value at the time of the collision of vehicles, the webbing 40 is locked so that it cannot be pulled out and the occupant is restrained. The well-known inflator 39 is ignited when the acceleration sensor detects the acceleration at or above the predetermined value and generates a high pressure gas by the combustion of propellant.

For the webbing 40, a lap belt 43 between the retractor 38 and the tongue 41 and a shoulder belt 44 between the tongue 41 and the inflator 39 are integrated and the tongue 41 can be freely slid in the vicinity of a connection of the lap belt 43 and the shoulder belt 44 of the webbing 40. The lap belt 43 is formed by a plainly woven belt made of normal synthetic fiber and the shoulder belt 44 is composed of a folded bag 44a made of urethane rubber and silicone rubber and an elastic cover 44b covering the outside.

A flange 45a of a nozzle member 45 is fixed by each bolt 46 on the upper face of the base plate 33 of the shoulder guard 32 on the right side. A holder 47, that holds the inflator 39, is fixed on the rear face of the base plate 33 by bolts 48 and 48. The upper end of the shoulder belt 44 of the webbing 40 is fitted to a hollow belt mounting part 45b protruding from the upper part of the nozzle member 45 to the inside of the body and is firmly fixed by a metallic band 49. A high pressure gas supply pipe 50 extends from the upper end of the inflator 39 and communicates with the belt mounting part 45b via a high pressure gas passage 45c formed inside the nozzle member 45.

Next, the action of the embodiment of the invention having the above-mentioned configuration will be described.

When the acceleration sensor detects the acceleration at or above the predetermined value due to a collision of the vehicle, the inflator 39 is ignited, high pressure gas is generated and when the high pressure gas is supplied from the high pressure gas supply pipe 50 to the bag 44a housed inside the shoulder belt 44 via the high pressure gas passage 45c of the nozzle member 45 and the belt mounting part 45b. The bag 44a is inflated together with the cover 44b by the high pressure gas. As the area of the shoulder belt engaging the breast of the occupant is increased, compared with the shoulder belt 44 before inflation when the shoulder belt 44 of the webbing 40 is inflated as described above, the occupant can be more softly restrained.

To adjust the upper and lower positions of each shoulder guard 32 according to the seated height of the occupant on the seat 16, the two bolts 36 and 36 have only to be inserted into new bolt holes 18a and 18a of the strut 18 in a state in which the shoulder guard 32 is moved to a suitable position and to be screwed into the bolt holes 33b and 33b of the base plate 33 after the two bolts 36 and 36 screwed into the bolt holes 33b and 33b of each base plate 33 are loosened and are extracted from the bolt holes 18a and 18a of the strut 18. At this time, as the upper end of the shoulder belt 44 of the air belt system 37 and the inflator 39 are provided to the right shoulder guard 32, the height of the upper end of the shoulder belt 44 can be manually adjusted in accordance with the occupant's seated height by adjusting the height of the shoulder guard 32. Thus, the time and labor required for the adjustment can be greatly reduced. In addition, as a positional relationship between the inflator 39 and the shoulder belt 44 is unchanged even if the shoulder guard 32 is vertically moved, a supply path of high pressure gas from the inflator 39 to the shoulder belt 44 is not complex.

As the lap belt 43 and the shoulder belt 44 are integrated and are inserted into the tongue 41 so that they can be slid, they can be wound by one retractor 38 and the number of parts can be reduced as compared with a case wherein the two retractors are provided that correspond with the lap belt 43 and the shoulder belt 44.

As the upper end of the shoulder belt 44 is directly fixed to the shoulder guard 32 and is not via a slip guide for pulling out the shoulder belt 44, the flow of high pressure gas from the inflator 39 is prevented from being interrupted by the slip guide and as a result, the inflation of the shoulder belt 44 is prevented from being delayed.

Figure 7:
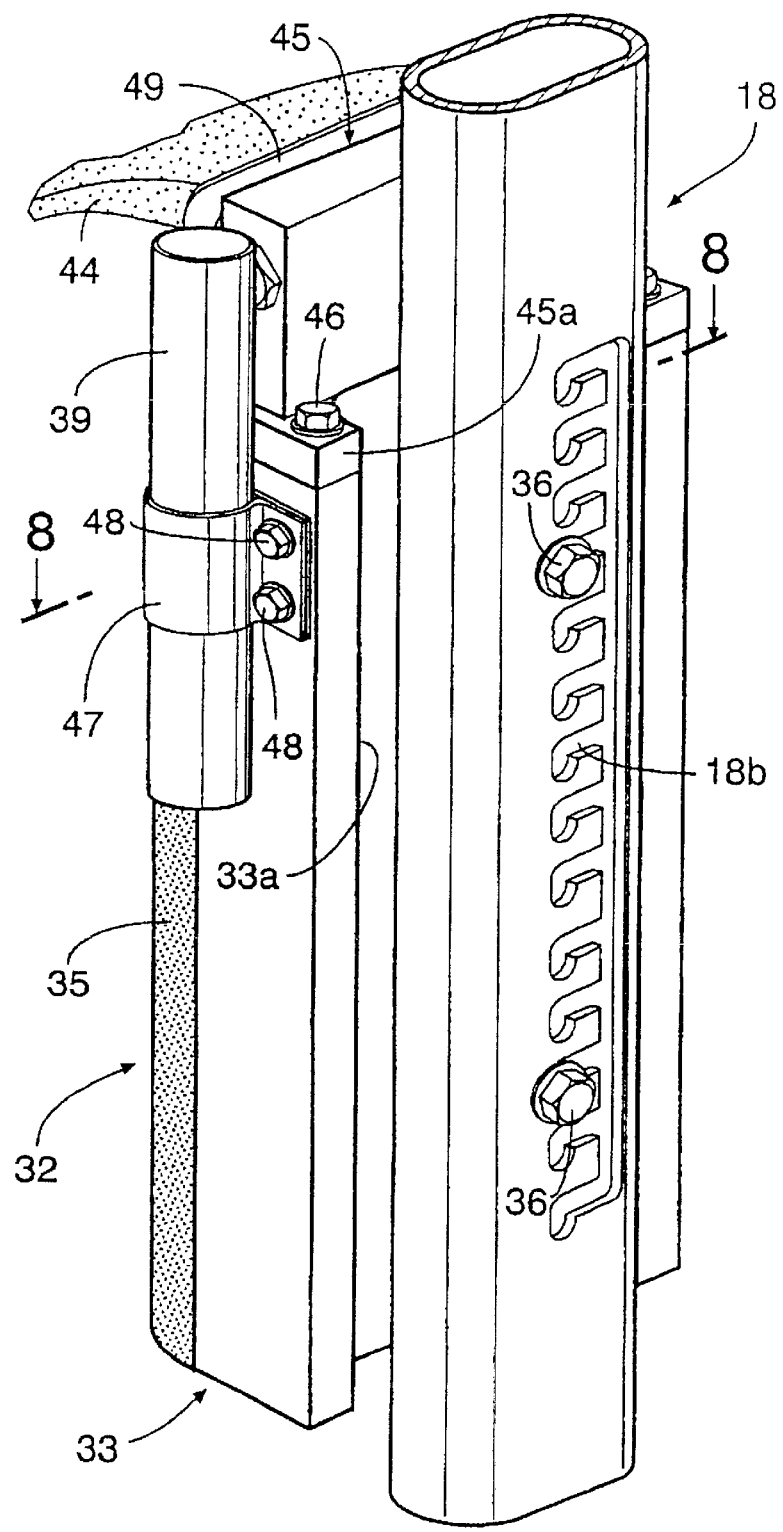
FIG. 7 is a perspective view showing a shoulder guard equivalent to a second embodiment of the invention.
Figure 8:
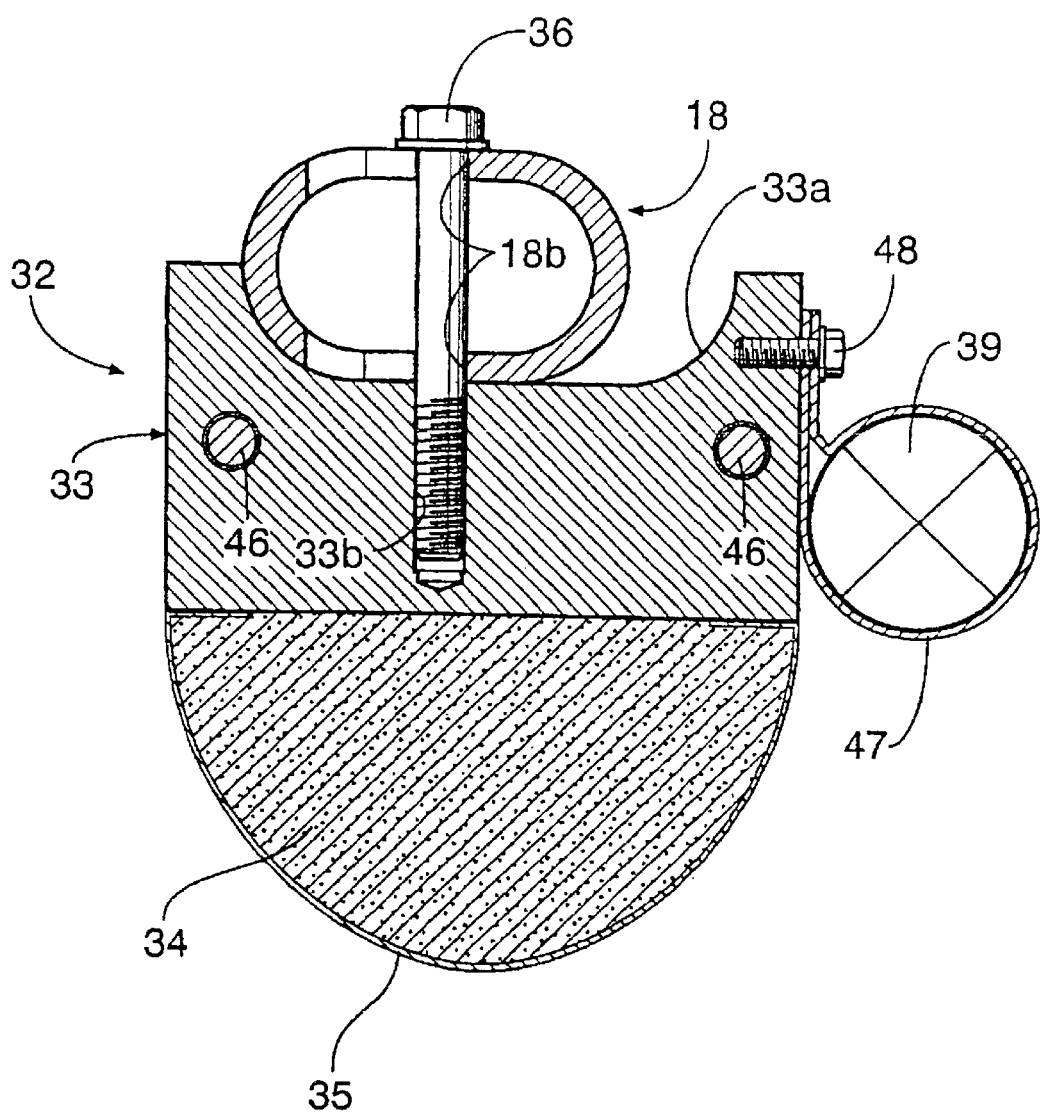
FIG. 8 is a sectional view along a line 8—8 in FIG. 7.
Figure 9:
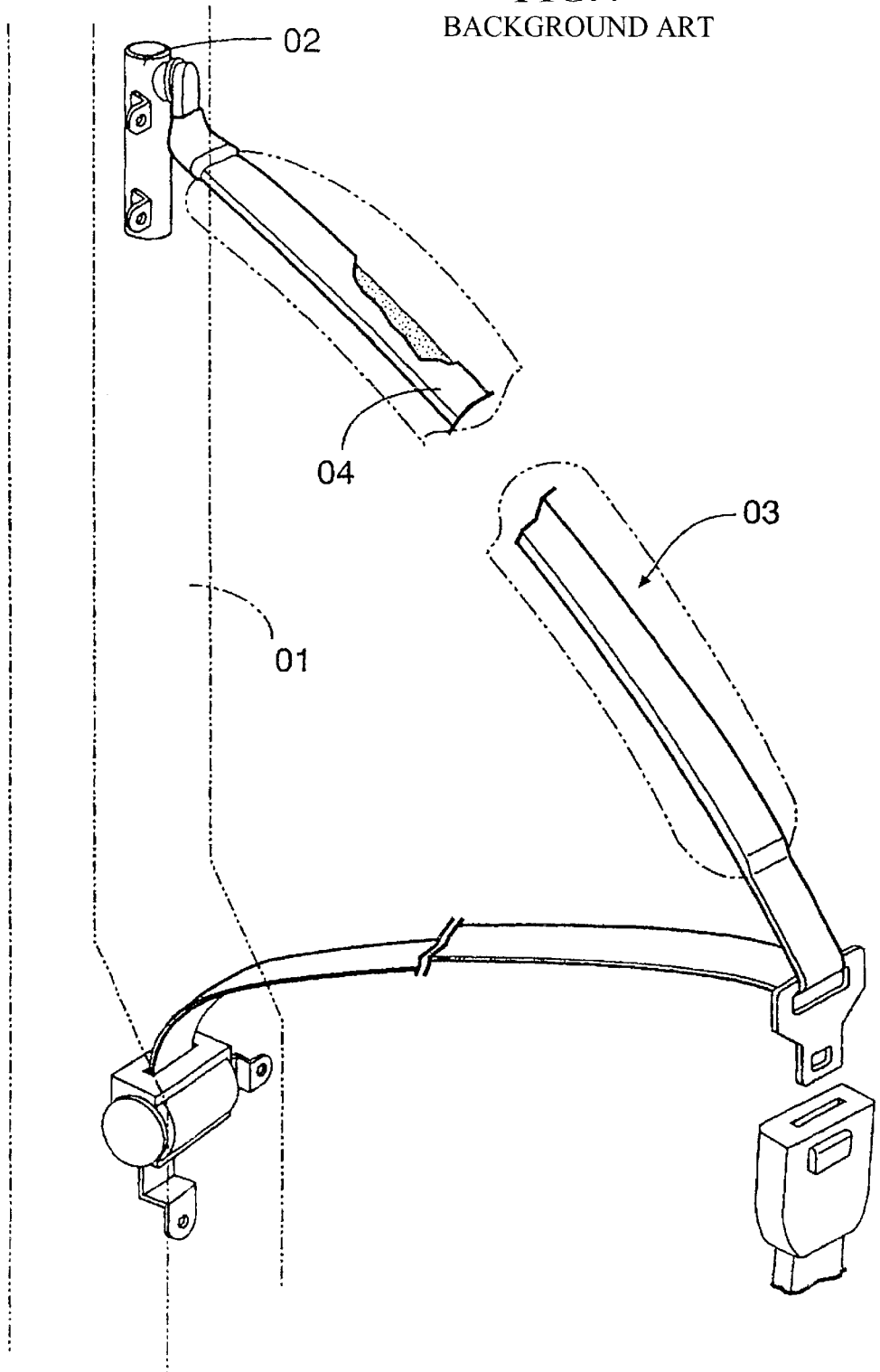
FIG. 9 is a perspective view showing a conventional type air belt system for a four-wheeled vehicle.

Next, referring to FIGS. 7 and 8, a second embodiment of the invention will be described. A shoulder guard 32 equivalent to the second embodiment is constructed to be wider so that a groove 33a of its base plate 33 can be slid forward or backward along a strut 18 and bolt holes 18b of the strut 18 are continuous like a comb. Therefore, when the position of the shoulder guard 32 is adjusted vertically along the strut 18, bolts 36 are moved along the bolt holes (slots) 18b in the shape of a comb by only loosening the bolts 36 without completely detaching them. The adjustment of the position of the shoulder guard 32 can be completed by only fitting the bolts again.

The embodiments of the invention have been described above in detail, however, the design of the invention may be variously changed in a range which does not deviate from the object.

For example, in the embodiments, the three-wheeled vehicle V is described. However, the present invention can be also applied to a two-wheeled vehicle and a four-wheeled vehicle if the vehicle is provided with shoulder guards 32 and 32 and struts 18 and 18, respectively, provided to the right and the left of a seat 16.

As described above, according to the present invention, as the end on the side of the shoulder belt of the webbing of the air belt system and the inflator are attached to one of the right and left shoulder guards provided to the struts on both right and left sides of the seat so that the position of each shoulder guard can be vertically adjusted, the height of the shoulder belt attached to the shoulder guard can be manually adjusted to a suitable height in accordance with the seated height of an occupant if the height of the shoulder guard is adjusted in accordance with the seated height of the occupant. In addition, time and labor required for the adjustment can be reduced. As the inflator is also attached to the shoulder guard and is also vertically moved together with the shoulder belt, positional relation between the inflator and the shoulder belt is unchanged and the supply path of high pressure gas from the inflator to the shoulder belt can be simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular passive safety device comprising:

a lap belt;

a shoulder belt capable of being inflated;

a retractor provided on one side of a seat for winding an end of the lap belt;

a tongue supported on an end portion of the lap belt wherein the tongue can slide relative thereto;

a buckle provided on the other side of the seat for detachably connecting the tongue relative thereto; and an inflator operatively connected to said shoulder belt for restraining an occupant by inflating the shoulder belt with high pressure gas from the inflator when a vehicle collides;

an end of said shoulder belt being disposed adjacent to the inflator and being attached to a first strut provided on a side of the seat wherein a height of the end of the shoulder belt can be adjusted for protecting a shoulder of the occupant, the first strut being a member extending from a position beside the seat upwardly to a roof supporter of the vehicle, the first strut and the roof supporter forming part of an inverted U-shaped member.

2. The vehicular passive safety device according to claim 1, and further including a first shoulder guard operatively connected to said first strut for protecting the shoulder of the occupant.

3. The vehicular passive safety device according to claim 1, wherein said shoulder belt includes a bag operatively connected to said inflator, said bag being inflated by said inflator upon actuation.

4. The vehicular passive safety device according to claim 1, and further including a second strut, said first strut being disposed on one side of the occupant and the second strut being disposed on an opposite side of the occupant, said shoulder belt being attached to a first shoulder guard and a second shoulder guard being operatively connected to said second strut.

5. The vehicular passive safety device according to claim 4, wherein said first shoulder guard is operatively connected to said first strut and includes said inflator operatively mounted thereon, said end of said shoulder belt being in communication with said inflator.

6. The vehicular passive safety device according to claim 4, wherein said first strut includes a plurality of apertures spaced along a length thereof for adjustably mounting said first shoulder guard relative thereto.

7. The vehicular passive safety device according to claim 4, wherein said second strut includes a plurality of apertures spaced along a length thereof for adjustably mounting said second shoulder guard relative thereto.

8. The vehicular passive safety device according to claim 4, wherein said first shoulder guard includes a groove for mounting relative to said first strut, said first strut including a plurality of slots disposed along a length thereof and further including a connector secured to said first shoulder guard and adapted to be selectively mounted relative to one of said plurality of slots for adjusting the height of said first shoulder guard.

9. A passive safety device adapted for use in a vehicle comprising:

a shoulder belt capable of being inflated;

an inflator mounted on a first shoulder guard, the inflator being operatively connected to said shoulder belt for inflating the shoulder belt with high pressure gas from the inflator upon the occurrence of a predetermined condition;

an end of said shoulder belt being disposed adjacent to the inflator and being mounted on the first shoulder guard wherein the first shoulder guard is adjustable for adjusting a height of said end of said shoulder belt; and said first shoulder guard being operatively connected to a first strut.

10. The passive safety device according to claim 9, wherein said shoulder belt includes a bag operatively connected to said inflator, said bag being inflated by said inflator upon actuation.

11. The passive safety device according to claim 9, and further including a second strut, said first strut being disposed on one side of an occupant of the vehicle and the second strut being disposed on an opposite side of the occupant of the vehicle, a second shoulder guard being operatively connected to said second strut.

12. The passive safety device according to claim 11, wherein said end of said shoulder belt is in communication with said inflator.

13. The passive safety device according to claim 11, wherein said first strut includes a plurality of apertures spaced along a length thereof for adjustably mounting said first shoulder guard relative thereto.

14. The passive safety device according to claim 11, wherein said second strut includes a plurality of apertures spaced along a length thereof for adjustably mounting said second shoulder guard relative thereto.

15. The passive safety device according to claim 11, wherein said first shoulder guard includes a groove for mounting relative to said first strut, said first strut including a plurality of slots disposed along a length thereof and further including a connector secured to said first shoulder guard and adapted to be selectively mounted relative to one of said plurality of slots for adjusting the height of said first shoulder guard.

\* \* \* \* \*